Figure 1:
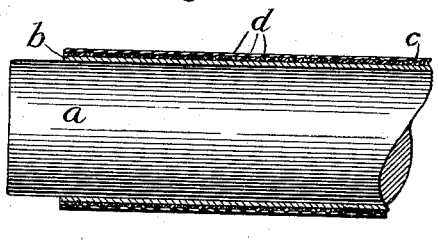

No. 708,952. Patented Sept. 9, 1902.
J. W. BLODGETT.
PNEUMATIC TIRE AND PROCESS OF MANUFACTURING SAME.
(Application filed Mar. 18, 1901.)
(No Model.)
2 Sheets—Sheet 1.

Witnesses:
Wm. Geiger
Watson Hurlburt

Inventor:
John W. Blodgett,
By Coburn, McRoberts & McElroy,
Attys.

UNITED STATES PATENT OFFICE.

JOHN W. BLODGETT, OF CHICAGO, ILLINOIS, ASSIGNOR, BY DIRECT AND MESNE ASSIGNMENTS, TO N. TIRE COMPANY, OF CHICAGO, ILLINOIS, A CORPORATION OF ILLINOIS.

PNEUMATIC TIRE AND PROCESS OF MANUFACTURING SAME.

SPECIFICATION forming part of Letters Patent No. 708,952, dated September 9, 1902.

Application filed March 18, 1901. Serial No. 51,579. (No model.)

*To all whom it may concern:*

Be it known that I, JOHN W. BLODGETT, a citizen of the United States, residing at Chicago, in the county of Cook and State of Illinois, have invented certain new and useful Improvements in Pneumatic Tires and Processes of Manufacturing the Same, of which the following is a specification.

My invention is designed to produce a pneumatic tire in which a single fabric, preferably knit, of any desired strength and size may be employed and is also concerned with the novel method of manufacturing the same.

To illustrate my invention, I annex hereto two sheets of drawings, in which the same reference characters are used to designate identical parts in all the figures, of which—

Figure 2:
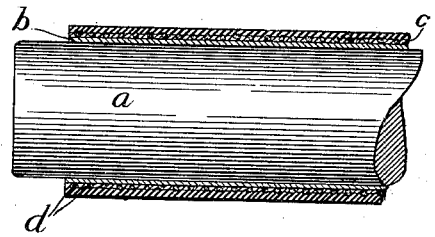
Figure 3:
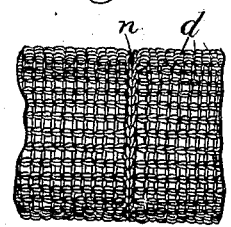
Figure 4:
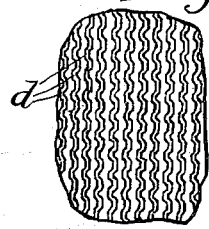
Figure 5:
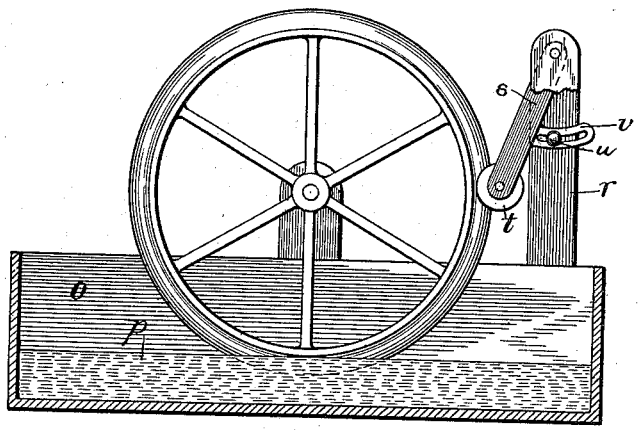
Figure 6:
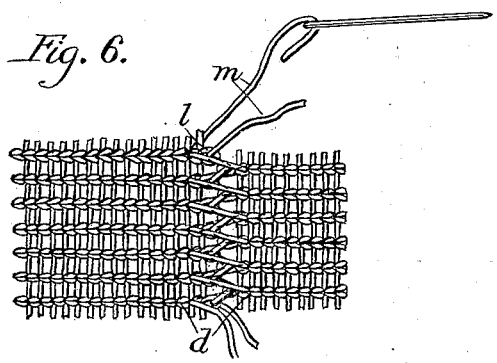
Figure 8:
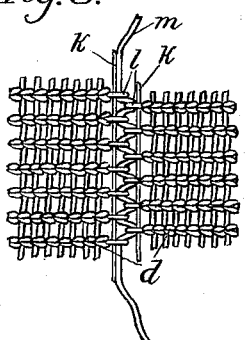
Figure 7:
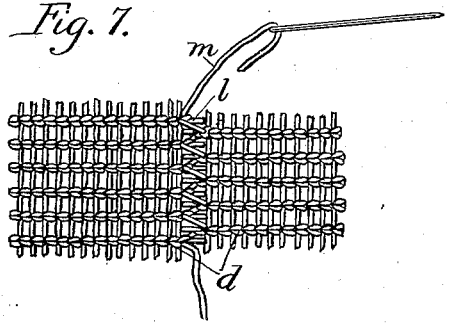
Figure 9:
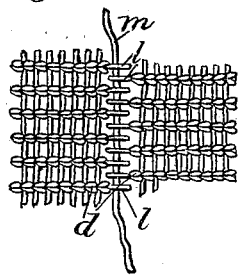
Figure 10:
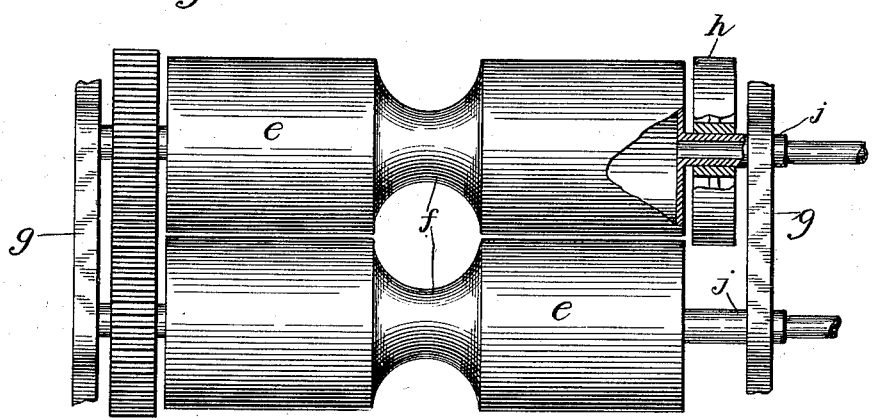
Figure 11:
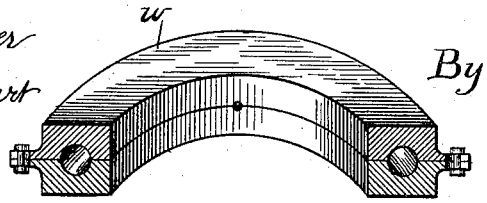

Figure 1 is a side elevation of a portion of the arbor with the partially-completed tire shown thereon in section. Fig. 2 is a similar view showing the tire thereon in section at another stage of the process. Fig. 3 is a side elevation of a portion of the knit fabric, showing the ends joined together by crocheting them. Fig. 4 is a view of a portion of the interior spread out and showing how the fabric appears in the completed tire. Fig. 5 is a side elevation, part in section, showing some of the apparatus used in carrying out the process of manufacture. Fig. 6 is a view of a portion of the fabric, showing one method of joining its ends. Fig. 7 is a similar view, but with the ends drawn closer together as they are when the ends are united. Fig. 8 is a view similar to Fig. 6, showing still another method of connecting the ends. Fig. 9 is another view similar to Fig. 8, but with the holding threads or wires withdrawn. Fig. 10 is a side elevation of a pair of rollers that may be employed in carrying out my invention; and Fig. 11 is a perspective view, partly in section, of molds which may be employed in carrying out my invention.

I first take an ordinary arbor $a$, and upon this I place an air-tube $b$, preferably vulcanized, or partially so. After coating this with raw-rubber solution I wrap around it a sheet of raw rubber $c$. It will be apparent that instead of employing a vulcanized or partially-vulcanized air-tube I might use an air-tube made of raw rubber, in which case the arbor must be soapstoned, so that the tube of raw rubber can be readily detached. Upon the raw-rubber exterior of the tube thus formed I place a tube of knit fabric $d$, which may be made of any desired size or kind of twine, depending upon the strength and size of the tire required. I might knit the tube separately and afterward draw it upon the tube on the arbor; but I preferably arrange a circular-knitting machine so that the arbor, with the raw-rubber tube thereon, can pass through it and form the tube of fabric knit in place on the raw-rubber tube—that is, on the arbor as it passes through the machine. When the tube is in place on the arbor, I may pass it between a pair of steam-rollers $e$, which are provided with the semicircular grooves $f$ therein, which are of the proper size so that the rollers will serve to press the fabric into the raw rubber. These rollers are mounted in suitable supports $d$ and are geared together at one end, as shown, and a pulley-wheel $h$ applied to one of them at the other end, so that they can be rotated by power. As shown, these rollers are hollow and have hollow bearings $j$, through which steam is introduced into the rollers to heat them, so that the fabric may be more readily embedded in the soft raw rubber.

Another method of embedding the fabric in the raw rubber is to saturate the fabric with naphtha or some equivalent substance, which serves to soften the rubber, so that the fabric will adhere thereto and prevent any possible relative displacement between the rubber tube and the tube of fabric and also prevent the stitches from pulling out at their ends when the ends are being fastened together. After the tube of fabric is thus embedded in or forced to adhere to the raw-rubber tube it is taken off of the arbor and the ends of the rubber tube are telescoped into each other, so as to bring the ends of the fabric together. To facilitate the connecting of these ends by any of the means to be described and to prevent the stitches pulling out, I run a string, or, preferably, a small wire $k$, through each of the loops $l$, forming the outer ends of the fabric. One simple way of connecting the ends thus brought together is to pass a thread $m$, by means of a needle, through each of the loops on both ends, alternating from the loop on one end to the adjacent loop on the other end, and so on, as clearly shown in Fig. 8. When the thread $m$ has been passed all the way around the tube, the wires $h$ are withdrawn and the ends of the thread $m$ are tied, it being advisable to make the length of the thread a little bit greater than the circumference of the tube to allow the possible stretching of the tire that occurs when it is inflated. Another method of connecting the ends is shown in Figs. 6 and 7 and consists in passing the string $m$ downward through a loop $h$ on one side, bringing it up and passing it upward through the adjacent loop $l$ on the other side, and so on, as shown in Fig. 6. Of course it will be understood that I might pass the string upwardly through the loops instead of downwardly. When the thread or string $m$ is tightened to bring the ends together, the joint appears as shown in Fig. 7. Instead of passing the thread through the outermost loops $l$ only I preferably pass it around a second time, passing it through the loops next to the outermost loops, as this prevents the ends being stretched apart and makes the tire doubly strong at the joint. Another method of connecting these ends of the fabric is to simply knit the loops $l$, forming the ends, together with a crocheting-needle, the seam when completed appearing as shown at $n$ in Fig. 3, where it will be seen that the cross-stitch thus formed is just the same as the longitudinal stitch forming the body of the fabric. Before the ends of the fabric are joined, as above described, the valve is put in place on the air-tube by cementing it in the usual way, one end of the fabric being turned back far enough to permit of this being done. When the end of the fabric is drawn back in place over the valve, a hole is formed in the fabric by drawing its threads apart sufficiently to permit the valve-stem being passed through the fabric, and the ends of the fabric are then joined, as before stated.

The tire may be placed upon a rim of the proper size and inflated to the size of tire that is desired. Before or after it is inflated the fabric is thoroughly saturated with naphtha, so that the raw rubber becomes soft enough so that the interior pressure of the inflated tire will force the raw rubber through the fabric. A heavy coating of rubber cement or solution is now applied, preferably, as shown in Fig. 5, by suspending the wheel over the trough $o$, which contains a certain depth of raw-rubber solution $p$, and rotating the wheel in said solution until it is sufficiently coated. To assist in forcing the solution into the tire, I preferably place a pair of standards $r$ at one end of the trough and pivot between these standards the yoke $s$, in the lower end of which is journaled a roller $t$, which has a semicircular groove in its periphery of the size to fit snugly upon the tire. By means of a set-screw $u$, passing through the slotted segmental arm $v$, secured to the yoke and into one of the standards $r$, I adjust a roller to produce any desired degree of friction upon the surface of the tire. After it is dry it is preferably given another coating in the same manner until the desired thickness of the solution upon the outer surface is obtained. One or both of the coatings of the rubber solution or separate partial coatings may be applied when the tire is off of the rim, so that it will be coated all over. Of course it will be understood that the coating of rubber solution might be applied with a brush.

A preferred method of embedding the fabric in the rubber is as follows: Instead of placing it upon the rim before inflating it I place it in an ordinary tire-mold $w$, such as is shown in section in Fig. 11, and with the fabric saturated with naphtha, as before. I then inflate it very strongly, more so than can be done safely without the mold, as the mold prevents it from bursting. This forces the rubber through the fabric even more thoroughly than when it is inflated on the rim. If a very strong coating of raw rubber has been used to start with and it is thus strongly inflated in the tire-mold, no coating of solution, such as is described above, need be applied, and for some kinds of tires no additional coating of any kind is needed; but for the better grades of tires as many layers of raw rubber are applied to the outside of the tire thus formed as may be necessary to give it the desired thickness. These layers of raw rubber to make up the thickness are similarly applied after the tire is inflated on the rim and the rubber solution is employed, these layers of raw rubber being applied after the solution is sufficiently dry. After the layers of raw rubber are applied to the tire, whether it is inflated on the rim or in the mold, the tire is then vulcanized in any of the usual ways known to the trade.

By this construction and method of manufacture it will be seen that I have produced a tire that has the advantage of having the fabric made of a single layer of web without any laps or seams instead of a plurality, as is customary in the ordinary construction. Any desired variations in the thickness and strength of the fabric are produced by using different sizes and qualities of thread in knitting the fabric, and it will be seen that there can be no destruction of the tire by reason of its separating along the line of the different fabrics, as occur with the ordinary tire constructed of several layers of fabrics. The fabric being knit is equally elastic and strong in all directions. The fabric I employ is so thoroughly saturated throughout by the rubber that it is impossible to separate the tubric from the rubber. This produces a tire that will last until the fabric is completely worn through.

While I have herein shown and described the method of and apparatus for frictioning a rubber tube by pressure on the outside thereof when the mandrel is inside of it, I do not herein claim that method, but reserve the subject-matter thereof for a divisional application.

While I have shown my invention as embodied in the form which I at present consider best adapted to carry out its purposes and as constructed by the method which I at present consider best, it will be understood that it is capable of modifications, and that I do not desire to be limited in the interpretation of the following claims except as may be necessitated by the state of the prior art.

What I claim as new, and desire to secure by Letters Patent of the United States, is—

1. As a new article of manufacture, a pneumatic tire having the tube of knit fabric embedded therein and its ends brought together and secured without overlapping by uniting the loops forming the ends of the tube; substantially as described.

2. As a new article of manufacture, a pneumatic tire having the tube of knit fabric embedded therein and its ends brought together and secured without overlapping by uniting the loops forming the ends of the tube by knitting them together; substantially as described.

3. As a new article of manufacture, a pneumatic tire having a tube of knit fabric embedded therein and its ends brought together and secured without overlapping by a cord passed alternately through the loops in the two ends; substantially as described.

4. As a new article of manufacture, a pneumatic tire having the tube of knit fabric embedded therein and its ends brought together and secured without overlapping by uniting the loops forming the ends of the tube by cords stitched through the loops; substantially as described.

5. In the art of making pneumatic tires, the process which consists of placing the tube of knit fabric over a tube of raw rubber; in joining the ends of the rubber tube and the ends of the fabric tube; in saturating the fabric and outer surface of the rubber tube with naphtha or some equivalent substance; in inflating the tire while still saturated to force the rubber through the meshes of the fabric; and in subsequently vulcanizing the tire thus formed; substantially as described.

6. In the art of making pneumatic tires, the process which consists of placing the tube of knit fabric over a tube of raw rubber; in joining the ends of the rubber tube and likewise the ends of the fabric tube; in saturating the fabric and outer surface of the rubber tube with naphtha or some equivalent substance; in inflating the tire while still saturated to force the rubber through the meshes of the fabric; in then applying additional layers of raw rubber; and finally in vulcanizing the tube thus formed; substantially as described.

7. In the art of making pneumatic tires, the process which consists of placing a tube of knit fabric over a tube of raw rubber; in joining the ends of the rubber tube and likewise the ends of the fabric tube; in saturating the fabric and outer surface of the rubber tube with naphtha or some equivalent substance; in placing the tube in a tire-mold; in then inflating the tire very strongly while in the mold and while still saturated to force the rubber through the meshes of the fabric; and in subsequently vulcanizing the tire thus formed; substantially as described.

8. In the art of making pneumatic tires, the process which consists of placing a coating of raw rubber over a tube of vulcanized rubber; in then placing a tube of knit fabric over the raw rubber; in joining the ends of the rubber tube and the ends of the fabric tube; in saturating the fabric and the outer surface of the raw rubber with naphtha or some equivalent substance; in inflating the tire while still saturated to force the raw rubber through the meshes of the fabric; and in subsequently vulcanizing the tire thus formed.

9. In the art of making rubber tubes with fabric embedded therein, the process which consists of placing a tube of fabric over a tube of raw rubber; in closing the ends of the tube to make it air-tight; in softening the raw rubber by any suitable means; in inflating the tube while the rubber is still softened to force it through the meshes of the fabric; and in subsequently vulcanizing the tube thus formed.

JOHN W. BLODGETT.

Witnesses:
G. H. WILLIS,
J. McROBERTS.